US007890408B2

(12) United States Patent
Menchero et al.

(10) Patent No.: US 7,890,408 B2
(45) Date of Patent: Feb. 15, 2011

(54) SYSTEM AND METHOD FOR ATTRIBUTING PERFORMANCE, RISK AND RISK-ADJUSTED PERFORMANCE OF AN INVESTMENT PORTFOLIO TO CUSTOM FACTORS

(75) Inventors: Jose Menchero, San Franciso, CA (US); Daniel Stefek, Oakland, CA (US); Vijay Poduri, San Ramon, CA (US)

(73) Assignee: Morgan Stanley Capital International, Inc., New York, NY (US)

( * ) Notice: Subject to any disclaimer, the term of this patent is extended or adjusted under 35 U.S.C. 154(b) by 564 days.

(21) Appl. No.: 11/974,197

(22) Filed: Oct. 11, 2007

(65) Prior Publication Data

US 2009/0099974 A1   Apr. 16, 2009

(51) Int. Cl.
  *G06Q 40/00* (2006.01)
(52) U.S. Cl. .................. 705/36 R; 35/37; 35/38; 35/39
(58) Field of Classification Search ............... 705/36 R, 705/35, 37, 38, 39
See application file for complete search history.

(56) References Cited

U.S. PATENT DOCUMENTS

| 7,249,082 B2 * | 7/2007 | Menchero ................ 705/36 R |
| 2002/0038272 A1 | 3/2002 | Menchero | |

FOREIGN PATENT DOCUMENTS

WO   WO 02/05066 A2   1/2002

OTHER PUBLICATIONS

Grinold, Richard, "Attribution", The Journal of Portfolio Management, Winter 2006, vol. 32, No. 2, pp. 9-22.
Menchero, Jose and Junmin Hu, "Portfolio Risk Attribution", The Journal of Performance Measurement, Spring 2006, vol. 10, No. 3, pp. 22-24; 26-33.
Menchero, Jose, "Risk-adjusted Performance Attribution", The Journal of Performance Measurement, Winter 2006/2007, vol. 11, No. 2, pp. 22-28.

(Continued)

*Primary Examiner*—Daniel S Felten
(74) *Attorney, Agent, or Firm*—K&L Gates LLP

(57) ABSTRACT

Systems and methods for attributing return, risk, and risk-adjusted performance for an investment portfolio. Residual factors for the investment portfolio may be determined based on a matrix of custom factors. The residual factors may correspond to a matrix of factor exposures for the portfolio that may be obtained by orthogonalizing true factors for the portfolio to the matrix of custom factors. The return of the portfolio may be attributed to the custom factors, the residual factors, and idiosyncratic effects. The risk of the portfolio may be attributed to the custom factors, the residual factors, and the idiosyncratic effects. The risk-adjusted performance may be attributed to the custom factors, the residual factors, and idiosyncratic effects based on the return attributions and the risk attributions. The return attribution, risk attribution and risk-adjusted performance attribution for each of the custom factors, the residual factors, and the idiosyncratic effects may be stored.

52 Claims, 2 Drawing Sheets

OTHER PUBLICATIONS

Menchero, et al., "Custom Factor Attribution", pp. 1-30.
Meucci, Attilio, "Risk contributions from generic user-defined factors", Risk, Jun. 2007, pp. 84-88 and Appendix, pp. 14-15.
Barra, "United States Equity—Version 3 (E3)", Risk Model Handbook, 1998, 107 pages.
Menchero, "An Optimized Approach to Linking Attribution Effects Over Time", The Journal of Performance Measurement, pp. 36-42, Fall 2000.
Menchero, et al., "Custom Factor Attribution", Financial Analysts Journal, vol. 64, No. 2, pp. 81-92, Mar./Apr. 2008.

* cited by examiner

US 7,890,408 B2

SYSTEM AND METHOD FOR ATTRIBUTING PERFORMANCE, RISK AND RISK-ADJUSTED PERFORMANCE OF AN INVESTMENT PORTFOLIO TO CUSTOM FACTORS

BACKGROUND

Many managers of investment portfolios employ a set of custom factors in their investment decision-making process. These managers want to know how their decisions impact the risk/return characteristics of the portfolio.

A common practice in today's asset management industry is to use one model for attributing portfolio returns, and to use an entirely different model for attributing risk. For instance, the active return of a portfolio is often decomposed into allocation and selection effect using the sector-based Brinson model. See Brinson, G., and N. Fachler, 1985. "Measuring Non-U.S. Equity Portfolio Performance." *Journal of Portfolio Management*, vol. 11, no. 3, (Spring): 73-76. The active risk of that very portfolio, however, is typically attributed to a set of factors within a fundamental factor model. This basic inconsistency obscures the intimate link between the sources of risk and return.

A better approach is to align both the return attribution and risk attribution models to the same underlying investment process. If, for instance, the manager follows a sector-based investment process, then the risk should also be attributed to the allocation and selection decision variables. How to attribute both ex ante and ex post tracking error to the allocation and selection decisions of the portfolio manager has been shown in a prior paper by Menchero and Hu. See Menchero, J., and J. Hu, 2006. "Portfolio Risk Attribution." *Journal of Performance Measurement*, vol. 10, no. 3, (Spring): 22-33. Using a consistent framework for attributing both return and risk may provide greater insight into the essential character of the portfolio.

A natural extension of this analysis is to combine return and risk attribution to explain sources of risk-adjusted performance. This results in an attribution of the information ratio reflecting the decision variables of the investment process. Menchero carried out such an analysis for the case of a sector-based investment scheme in another earlier paper. See Menchero, J., 2006/2007. "Risk-adjusted Performance Attribution." *Journal of Performance Measurement*, vol. 11, no. 2, (Winter): 22-28. Menchero showed that the portfolio information ratio was the weighted average of the component information ratios for each investment decision. The relevant weights, however, are not the investment weights, but rather the risk weights.

A major outstanding question is how to extend this unified attribution framework for a factor-based investment process, when return, risk, and risk-adjusted performance are attributed to set of custom factors.

SUMMARY OF THE INVENTION

In one general aspect, the present invention is directed to systems and methods for attributing return, risk, and risk-adjusted performance for an investment portfolio to a set of custom factors. According to various embodiments, residual factors for the investment portfolio may be determined based on a matrix of the custom factors. The residual factors may correspond to a matrix of factor exposures for the portfolio that may be obtained by orthogonalizing true factors, represented by the risk factors of a risk model, for the portfolio to the matrix of custom factors. The return, risk and risk-adjusted performance of the portfolio may be attributed to the custom factors, the residual factors, and idiosyncratic effects.

This attribution methodology may be aligned to the decision variables of the portfolio manager. This approach may also provide fall drilldown capability, so that it can be explained how each decision contributes to return, risk, and risk-adjusted performance. According to various embodiments, this risk attribution scheme produces intuitive factor exposures, does not introduce spurious ordering schemes, and fully accounts for portfolio risk. This methodology may be applied either ex ante or ex post. For instance, ex ante information ratio analysis may give insight into the relationship between constraints and implementational efficiency, whereas the ex post counterpart may be used to provide risk-adjusted attribution analysis.

BRIEF DESCRIPTION OF THE FIGURES

Embodiments of the present invention are described herein by way of example in conjunction with the following figures, wherein.

DETAILED DESCRIPTION OF THE INVENTION

Figure 1:
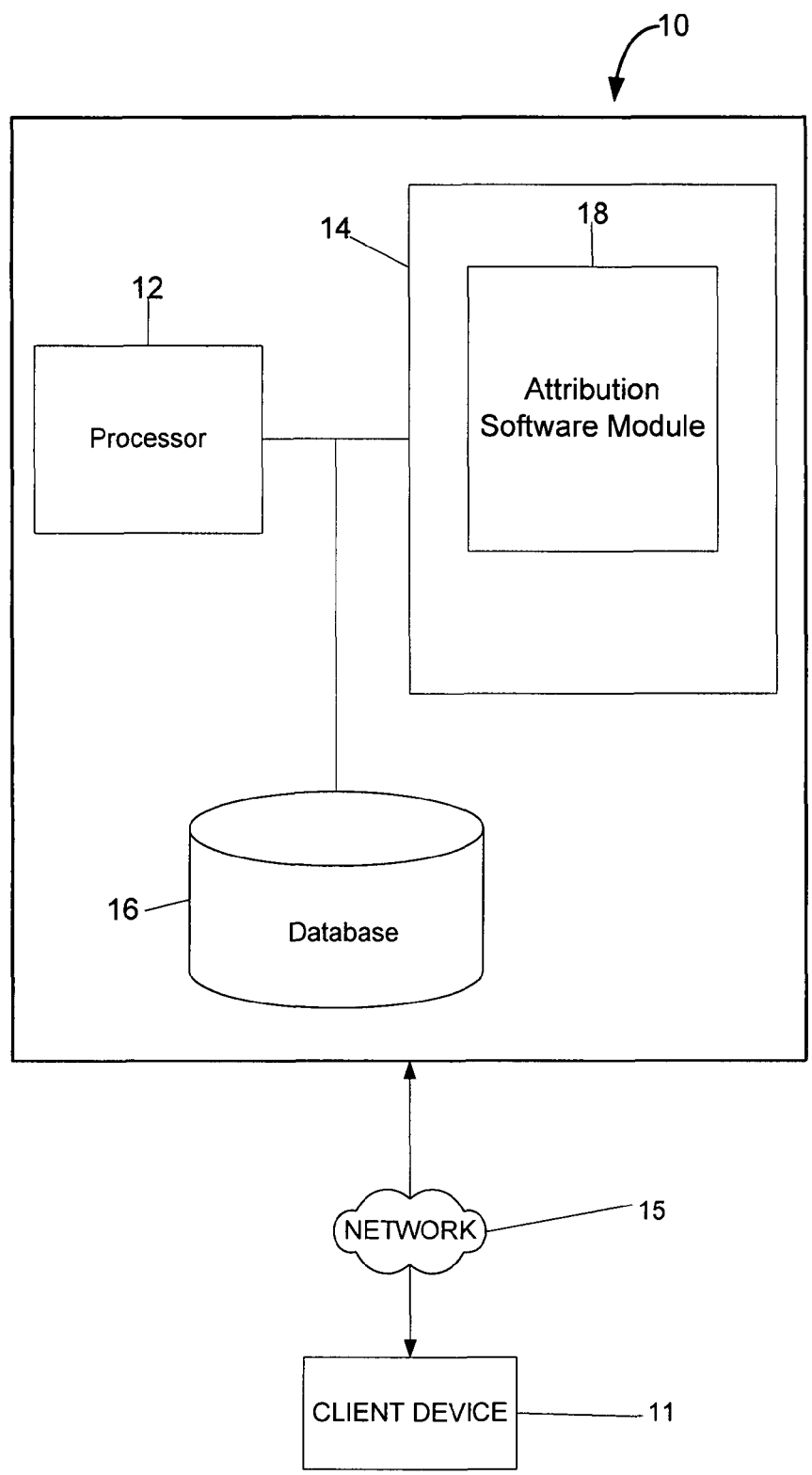
FIG. 1 depicts a computer system according to one embodiment of the present invention.

According to various embodiments, the present invention is directed to systems and methods for attributing return, risk, and/or risk-adjusted performance of an investment portfolio to a set of investment decisions or custom factors. As shown in FIG. 1, one embodiment of the present invention may comprise a computer system 10 that attributes (or calculates the attribution of) the return, risk, and risk-adjusted performance for an investment portfolio comprising one or, more preferably, a number of securities. The securities in the portfolio may be any type of suitable financial security, such as equity securities (e.g., stock), debt or fixed income securities (e.g., bonds, notes, mortgage-backed securities), and/or hybrid securities. As described forth below, the system 10 can calculate values for residual factors for the portfolio, and based thereon, attribute return, risk, and risk-adjusted performance to a set of custom factors.

The computer system may comprise one or more processors 12 in communication with a memory 14 and a database 16. The database 16 may store financial data for the securities in the portfolio and/or a matrix of the custom factors that may be transmitted or downloaded to the computer system 10. The memory 14 may comprise an attribution software module 18. When the processor 12 executes the code of the attribution software module 18, the processor 12 may be caused to attribute return, risk, and risk-adjusted performance to the set of custom factors.

The computer system 10 may comprise one or a number of networked computer devices, such as personal computers, laptops, mainframe computers, servers, workstations, or any other suitable computing devices. The memory 14 may be any suitable type of computer-readable medium, such as, for example, random access memory (RAM), read-only memory (ROM), a magnetic medium, such as a hard drive or floppy disk, or an optical medium, such as a CD-ROM. The attribution software module 18 may be implemented as software code to be executed by the processor(s) 12 using any suitable computer language. The software code may be stored as a series of instructions or commands in the memory 14.

In various embodiments, using a client device 11, a client may communicate with the system 10 through a network 15. For example, in one embodiment, the client may transmit the matrix of custom factors to the system 10 from the client device 11 via the network 15. Also, the system 10 may transmit the results of the attribution process, described further below, to the client device 11 via the network 15. The client device 11 may be any network-enabled device, such as a personal computer, a server, a laptop, a personal data assistant (PDA), a wireless e-mail device, a smart phone, or any other programmable device or appliance configured to communicate with the network 15. The network 15 may include a suitable communications network, such as LAN, WAN, MAN, the Internet, etc., having wired and/or wireless links.

According to various embodiments, true asset returns of the portfolio may be generated by a set of systematic factors, denoted X. If there are K such factors, then the true return-generating process may be written as $$r_n = \sum_{k=1}^{K} X_{nk} f_k^{(X)} + e_n^{(X)}, \quad (1)$$

where $r_n$ is the return to asset n, $X_{nk}$ is the asset exposure to factor k, $f_k^{(X)}$ is the factor return, and $e_n^{(X)}$ is idiosyncratic return. The idiosyncratic returns may be taken to be mutually uncorrelated and also may be uncorrelated with the factor returns. The superscript (X) denotes that the quantity is estimated with respect to the X basis.

Since Equation 1 may represent the true return-generating process, the factors X may be the correct ones to include for risk estimation purposes. The risk model factors may be known on an ex ante basis, and they may be assumed to represent the true factors.

The portfolio return may be given by $$R = \sum_{n=1}^{N} w_n r_n, \quad (2)$$

where $w_n$ is the portfolio weight, and N is the number of assets. Inserting Equation 1 into Equation 2 leads to $$R = \sum_{k=1}^{K} X_k^P f_k^{(X)} + \sum_{n=1}^{N} w_n e_n^{(X)}, \quad (3)$$

where $$X_k^P = \sum_{n=1}^{N} w_n X_{nk} \quad (4)$$

is the portfolio exposure to factor k.

Equation 3 attributes portfolio return to a factor component $$\left( \sum_{k=1}^{K} X_k^P f_k^{(X)} \right)$$

and an idiosyncratic component $$\left( \sum_{n=1}^{N} w_n e_n^{(X)} \right).$$

A potential problem with this approach may be that the factors may not match the investment process of the portfolio manager. Therefore, although X may represent the "right" factors for risk forecasting purposes, they may be the "wrong" factors for performance attribution purposes.

Figure 2:
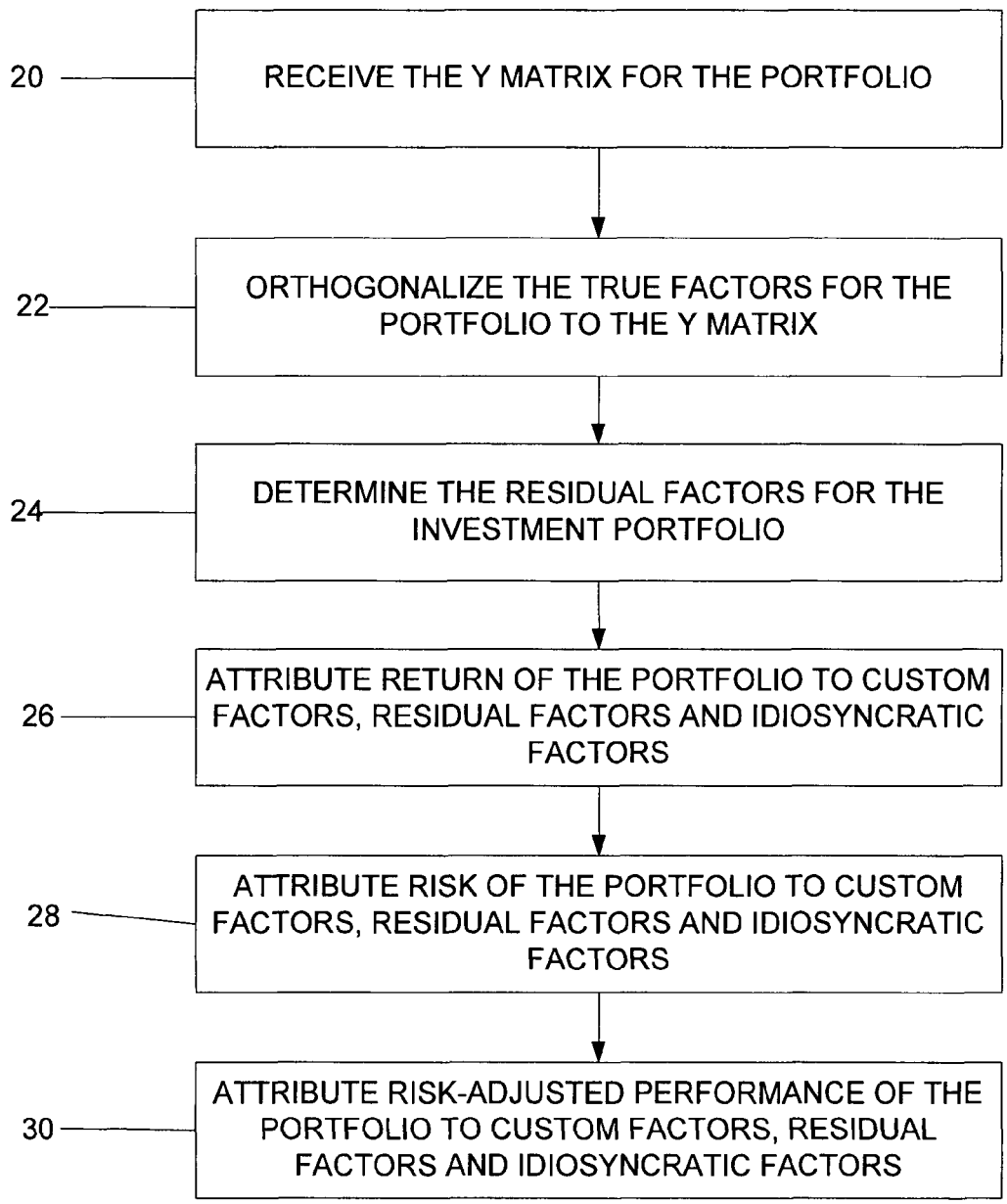
FIG. 2 is a flowchart illustrating steps taken to attribute performance, risk and risk-adjusted performance to a general set of investment decisions.

FIG. 2 illustrates the process flow of the attribution software module 18 according to various embodiments of the present invention. At step 20, a matrix Y of the custom factors for the portfolio may be received, such as via the network 15 (see FIG. 1) or downloaded to the database 16 in some other suitable fashion. The Y matrix comprises the custom factors (e.g., a market factor, a beta factor, a value factor, or a size factor) chosen by the portfolio manager. These may represent (0,1) membership in custom groupings, exposures to macro-economic variables, expected alpha of stocks, and any other suitable measure. In various other embodiments, the custom factor may be a number assigned to each stock in the portfolio. The Y matrix may reflect the investment process of the portfolio manager. The return structure with respect to these factors may be given by $$r_n = \sum_{l=1}^{L} Y_{nl} f_l^{(Y)} + e_n^{(Y)}, \quad (5)$$

where $Y_{nl}$ is the exposure of asset n to custom factor l, $f_l^{(Y)}$ is factor return, $e_n^{(Y)}$ is the residual return, and L is the total number of custom factors. The superscript (Y) in this case denotes that the quantities are estimated in the Y basis. It may not be assumed that $e_n^{(Y)}$ are mutually uncorrelated, nor that $e_n^{(Y)}$ and $f_l^{(Y)}$ are uncorrelated.

Using matrix notation, let Y denote an N×L matrix of custom factor exposures. The true return-generating process may be expressed in matrix form as $$r = X f_x + e_x, \quad (6)$$

where r is the N×1 vector of asset returns, X is the N×K matrix of true factor exposures (which, as mentioned above, may be based on the risk factor for the risk model), $f_x$ is the K×1 vector of factor returns, and $e_x$ is an N×1 vector of residual returns. The portfolio return may be given by $$R = w'r, \quad (7)$$

where w' is the 1×N vector of portfolio weights. The asset covariance matrix may be $$V = XFX' + \Delta, \quad (8)$$

where F is the K×K factor covariance matrix, and $\Delta$ is the diagonal N×N specific variance matrix. The risk of the portfolio may be given by the usual expression, $$\sigma(R) = \frac{w'Vw}{\sigma(R)} \quad (9)$$

According to various embodiments, substituting Equation 5 into Equation 2, the following equation may be obtained:

$$R = \sum_{l=1}^{L} Y_l^P f_l^{(Y)} + \sum_{n=1}^{N} w_n e_n^{(Y)}, \quad (10)$$

where $Y_l^P$ is the portfolio exposure to custom factor l. Equation 10 attributes portfolio return to the factors that may drive the investment process.

There may be a number of shortcomings with the return decomposition of Equation 10. One of these shortcomings may be that the custom factors Y (e.g., a market factor, a beta factor, a value factor, a size factor) may not account for all of the factor risk, which can only be fully explained by the risk factors X. In mathematical terms, the custom factors Y may not "span the space" of the risk factors X. Thus, when it comes time to attribute risk, a gap may be found between the risk model forecast and the factor risk attributable to Y.

According to various embodiments, at step 22, a potential solution to this problem may be to include the true risk factors, but only after orthogonalizing them to the matrix of custom factors Y. Let $\tilde{X}$ denote these residual factors. At step 24, the residual factors $\tilde{X}$ for the investment portfolio may be determined, which, by construction, may obey the following condition:

$$\sum_{n=1}^{N} \tilde{X}_{nk} Y_{nl} = 0, \quad (11)$$

for all k and l. $\tilde{X}$ can now be included in the regression without affecting (i.e., confounding) the factor returns in Y. In addition, $\tilde{X}$ may capture all of the factor risk left unexplained by Y.

Once again, employing matrix notation, the true factors X for the portfolio may be orthogonalized to the matrix of custom factors Y. $\tilde{X}$ may denote the N×K matrix of factor exposures that may be obtained by orthogonalizing the true factors X to the custom factors Y. The residual factors $\tilde{X}$ may then be determined by:

$$\tilde{X} = P_{Y\perp} X, \quad (12)$$

where $P_{Y\perp}$ is the projection operator that may preserve any component perpendicular to Y, and may annihilate any component within the space of Y. This projection operator may be defined by $$P_{Y\perp} = I_N - Y(Y'Y)^{-1} Y', \quad (13)$$

where $I_N$ is the N×N identity matrix.

Using this projection factor, the following may be obtained:

$$Y'\tilde{X} = Y'X - Y'Y(Y'Y)^{-1}Y'X = 0, \quad (14)$$

so that $\tilde{X}$ may be orthogonal to Y.

The complementary projection operator $P_Y$, which may preserve everything within the space of Y, and may annihilate all components outside the space, may be defined as $$P_Y = Y(Y'Y)^{-1} Y'. \quad (15)$$

In various embodiments, a projection operator and its complement may give the identity matrix, $$P_Y + P_{Y\perp} = I_N, \quad (16)$$

which may turn out to be a useful property in derivations.

According to various embodiments, the augmented return structure may be written as $$r_n = \sum_{l=1}^{L} Y_{nl} f_l^{(Y)} + \sum_{k=1}^{K} \tilde{X}_{nk} f_k^{(\tilde{X})} + \tilde{e}_n. \quad (17)$$

The augmented return structure, given by Equation 17, may be expressed in matrix notation as $$r = Yf_Y + \tilde{X}f_X + \tilde{e}, \quad (18)$$

where $f_Y$ is the L×1 vector of custom factor returns, $f_X$ is the K×1 vector of returns to the residual factors, and $\tilde{e}$ is the N×1 vector of idiosyncratic returns.

Using matrix notation, the factor returns may be estimated by ordinary least squares ("OLS") regression as $$f_Y = (Y'Y)^{-1} Y'r, \quad (19)$$

and similarly $$f_X = (\tilde{X}'\tilde{X})^{-1} \tilde{X}'r. \quad (20)$$

The fact that the OLS solution may be partitioned in this manner (i.e., $f_Y$ does not depend on $\tilde{X}$, and $f_X$ does not depend on Y) may be a consequence of the orthogonality of Y and $\tilde{X}$.

In various embodiments, at step 26, the return of the portfolio may then be attributed to custom factors, the residual factors and the idiosyncratic effects. Plugging Equation 17 into Equation 2 yields $$R = \sum_{l=1}^{L} Y_l^P f_l^{(Y)} + \sum_{k=1}^{K} \tilde{X}_k^P f_k^{(\tilde{X})} + \sum_{n=1}^{N} w_n \tilde{e}_n. \quad (21)$$

This can be conveniently rewritten in compact notation as $$R = R_Y + R_X + R_e, \quad (22)$$

where $R_Y$ is the return attributable to custom factors, $R_X$ is the return due to residual factors, and $R_e$ is the return from idiosyncratic effects.

Using matrix notation, the portfolio return may be written as $$R = R_Y + R_X + R_e, \quad (23)$$

where $$R_Y = w' P_Y r \quad (24)$$

may be the return attributable to custom factors, $$R_X = w' P_X r \quad (25)$$

may be the return attributable to residual factors, and $$R_e = w'(I_N - P_Y - P_X) r, \quad (26)$$

may be the purely idiosyncratic return. These three terms ($R_Y$, $R_X$, and $R_Y$) may explain all of the portfolio return.

According to various embodiments, at step 28, risk for the portfolio may also be attributed to the custom factors, the residual factors and the idiosyncratic effects. The solution may satisfy certain criteria. First, the exposures to the custom factors may be intuitive and aggregate in the usual way (e.g., according to Equation 4); the manager may know the portfolio exposures to the custom factors, and these may not be altered by the risk attribution scheme. Second, the risk decomposition may not depend on any ordering scheme for the custom factors; such a scheme may be arbitrary, and not reflective of the investment process. Third, the portfolio risk may be fully accounted for.

The risk decomposition may be obtained by first applying the equation $$\sigma(R) = \sum_{m=1}^{M} x_m \sigma(g_m) \rho(g_m, R)$$

to the return attribution of Equation 22. This yields $$\sigma(R) = \sigma_Y + \sigma_X + \sigma_e, \quad (27)$$

where $\sigma(R)$ is the tracking error forecast from the risk model, $\sigma_Y = \sigma(R_Y)\rho(R_Y,R)$ is the risk attributable to custom factors, $\sigma_X = \sigma(R_X)\rho(R_X,R)$ is the risk contribution from the residual factors, and $\sigma_e = \sigma(R_e)\rho(R_e,R)$ is the risk due to the idiosyncratic component.

The risk components may be analyzed by application of the equation $$\sigma(R) = \sum_{m=1}^{M} x_m \sigma(g_m) \rho(g_m, R)$$

to Equation 23. Hence, $$\sigma_Y = \sum_{l=1}^{L} Y_l^P \sigma(f_l^{(Y)}) \rho(f_l^{(Y)}, R) \quad (28)$$

may decompose the custom factor risk on a factor-by-factor basis. Similarly, $$\sigma_{\tilde{X}} = \sum_{k=1}^{K} \tilde{X}_k^P \sigma(f_k^{(\tilde{X})}) \rho(f_k^{(\tilde{X})}, R) \quad (29)$$

attributes the risk of the residual factors, and finally, $$\sigma_{\tilde{e}} = \sum_{n=1}^{N} w_n \sigma(\tilde{e}_n) \rho(\tilde{e}_n, R) \quad (30)$$

may attribute the idiosyncratic risk at the security level. All of the volatilities and correlations appearing in Equations 28-30 may be computed using the ex ante risk model. Explicit formulae for these volatilities and correlations using matrix notation are detailed below.

Using matrix notation, the risk of the portfolio may be attributed to the custom factors, the residual factors and the idiosyncratic effects. The risk may be attributed to the same return sources contained in Equation 23—the custom factors, the residual factors and the idiosyncratic effects. In other words, $$\sigma(R) = \sigma_Y + \sigma_{\tilde{X}} + \sigma_{\tilde{e}} \quad (31)$$

where $$\sigma_Y = \frac{w' P_Y V w}{\sigma(R)} \quad (32)$$

may be the risk attributable to custom factors, $$\sigma_{\tilde{X}} = \frac{w' P_{\tilde{X}} V w}{\sigma(R)} \quad (33)$$

may be the risk attributable to residual factors, and $$\sigma_{\tilde{e}} = \frac{w' (I_N - P_Y - P_{\tilde{X}}) V w}{\sigma(R)} \quad (34)$$

may be the risk due to purely idiosyncratic effects. It may be observed that these three terms ($\sigma_Y$, $\sigma_{\tilde{X}}$, and $\sigma_{\tilde{e}}$) may fully account for portfolio risk.

According to various embodiments, the next task may be to write explicit expressions for the volatilities and correlations of the factor portfolios. $\delta_l$ may be an L-dimensional vector whose $l^{th}$ component may be one, and with zeroes for all other components. The volatility of the custom factor portfolio $$\sigma(f_l^{(Y)}) = \frac{\delta_l'(Y'Y)^{-1} Y' V Y (Y'Y)^{-1} \delta_l}{\sigma(f_l^{(Y)})}, \quad (35)$$

and the correlation of the factor portfolio with the overall portfolio may be $$\rho(f_l^{(Y)}, R) = \frac{\delta_l'(Y'Y)^{-1} Y' V w}{\sigma(f_l^{(Y)}) \sigma(R)}. \quad (36)$$

The factor marginal contribution to risk may be given by the product of the volatility or $\sigma(f_l^{(Y)})$ and the correlation $\rho(f_l^{(Y)}, R)$, and may reduce to $$\sigma(f_l^{(Y)}) \rho(f_l^{(Y)}, R) = \frac{\delta_l'(Y'Y)^{-1} Y' V w}{\sigma(R)}. \quad (37)$$

Meanwhile, the portfolio exposure to custom factor l may be $$Y_l^P = w' Y \delta_l. \quad (38)$$

Equation 28 may become $$\sum_{l=1}^{L} Y_l^P \sigma(f_l^{(Y)}) \rho(f_l^{(Y)}, R) = \sum_{l=1}^{L} \frac{w' Y \delta_l \delta_l'(Y'Y)^{-1} Y' V w}{\sigma(R)}. \quad (39)$$

However, note that $$I_L = \sum_{l=1}^{L} \delta_l \delta_l' \quad (40)$$

may be the L×L identity matrix. Therefore, Equation 39 may reduce to $$\sum_{l=1}^{L} Y_l^P \sigma(f_l^{(Y)}) \rho(f_l^{(Y)}, R) = \frac{w' P_Y V w}{\sigma(R)} = \sigma_Y, \quad (41)$$

which is Equation 28.

Similarly, the specific volatility for stock n may be $$\sigma(\tilde{e}_n) = \frac{\delta_n'(I_N - P_Y - P_{\tilde{X}})V(I_N - P_Y - P_{\tilde{X}})\delta_n}{\sigma(\tilde{e}_n)}, \quad (42)$$

and the correlation of this return with the portfolio return may be $$\rho(\tilde{e}_n, R) = \frac{\delta_n'(I_N - P_Y - P_{\tilde{X}})Vw}{\sigma(\tilde{e}_n)\sigma(R)}. \quad (43)$$

This may be verified as $$\sum_{n=1}^{N} w_n \sigma(\tilde{e}_n) \rho(\tilde{e}_n, R) = \frac{w'(I_N - P_Y - P_{\tilde{X}})Vw}{\sigma(R)} = \sigma_{\tilde{e}} \quad (44)$$

which is Equation 30.

In various embodiments, although it may not be obvious from Equation 43, it may be shown that $\sigma_e$ may be in fact purely idiosyncratic in nature. This may be seen by noting $P_X X = \tilde{X}$ and $(I_N - P_Y) = P_{Y\perp}$, so that $(I_N - P_Y - P_X)X = 0$. By contrast, $\sigma_Y$ and $\sigma_X$ may contain both a factor component and a specific component.

This risk attribution methodology may satisfy the three criteria. For instance, the factor exposures $Y_l^P$ may be intuitive and obtained in the usual way (via Equation 4). Second, the risk attribution methodology may be independent of any ordering of the factors. Finally, this scheme may fully account for portfolio risk.

With the return attribution and risk attribution accomplished, the final step may be to attribute risk-adjusted performance, as measured by an information ratio. According to various embodiments, at step 30, the risk-adjusted performance for the portfolio may be attributed to the custom factors, the residual factors, and the idiosyncratic effects. Applying the equation $$IR = \sum_{m=1}^{M} u_m IR_m$$

to Equation 22, may yield $$IR = u_Y IR_Y + u_X IR_X + u_e IR_e, \quad (45)$$

where $u_Y = [\sigma_Y/\sigma(R)]$ is the risk weight of the custom factors, $IR_Y = [R_Y/\sigma_Y]$ is the component information ratio of the custom factors, $u_X = \lfloor \sigma_X/\sigma(R) \rfloor$ is the risk weight of the residual factors, $IR_X = \lfloor R_X/\sigma_X \rfloor$ is the component information ratio of the residual factors, $u_e = [\sigma_e/\sigma(R)]$ is the risk weight of the idiosyncratic effects, and $IR_e = [R_e/\sigma_e]$ is the component information ratio of the idiosyncratic effects. Drilling down to the factor level, may yield $$IR_Y = \frac{1}{u_Y} \sum_{l=1}^{L} u_l IR_l, \quad (46)$$

where $u_l$ is the risk weight of custom factor l, and $IR_l$ is the corresponding component information ratio.

The information ratio decomposition presented here may be valid either ex ante or ex post. If the portfolio is optimized without constraints, then each unit of risk may bring the same amount of expected return. In this case, the ex ante component information ratios may be constant (e.g., equal to the portfolio IR).

In the ex post case, of course, wide variations in the component information ratios across the portfolio may be expected. This may be because the realized returns can differ sharply from the ex ante forecasts. For example, this may occur especially over short time periods.

The intentional bets of the portfolio manager may have much larger correlations and should be described well by the custom factors. One of the benefits of this analysis may be to highlight and differentiate the intentional bets from the incidental ones.

The results from the attribution calculations may be stored in the database 16 (see FIG. 1) or some other memory or store associated with the system 10. Also the results from the attribution calculations may be transmitted in one or more files to the client device 11 via the network 15.

While several embodiments of the invention have been described, it should be apparent, however, that various modifications, alterations and adaptations to those embodiments may occur to persons skilled in the art with the attainment of some or all of the advantages of the present invention. For example, certain steps of the process flow of FIG. 2 may be performed in different orders. It is therefore intended to cover all such modifications, alterations and adaptations without departing from the scope and spirit of the present invention as defined by the appended claims.

What is claimed is:

1. A computer-implemented method comprising:

determining, by a computer system, residual factors for an investment portfolio based on a matrix of custom factors, wherein the custom factors reflect an investment process for the investment portfolio, and wherein the residual factors correspond to a matrix of factor exposures for the investment portfolio obtained by orthogonalizing risk factors for the investment portfolio to the matrix of custom factors, wherein the risk factors account for risk in the investment portfolio and are different from the custom factors, and wherein the computer system comprises at least one processor;

determining, by the computer system, an attribution of the return of the investment portfolio to the custom factors, an attribution of the return of the investment portfolio to the residual factors, and an attribution of the return of the investment portfolio to idiosyncratic effects; and determining, by the computer system, an attribution of the risk of the investment portfolio to the custom factors, an attribution of the risk of the investment portfolio to the residual factors, and an attribution of the risk of the investment portfolio to the idiosyncratic effects.

2. The method of claim 1, further comprising determining, by the computer system, an attribution of the risk-adjusted performance for the investment portfolio to the custom factors, an attribution of the risk-adjusted performance for the investment portfolio to the residual factors, and an attribution of the risk-adjusted performance for the investment portfolio to idiosyncratic effects based on the return attributions and the risk attributions.

3. The method of claim 1, wherein the custom factors comprise at least one of a market factor, a beta factor, a value factor, or a size factor.

4. The method of claim 1, wherein the custom factor return attribution is based on the custom factors and custom factor returns.

5. The method of claim 1, wherein the residual factor return attribution is based on the residual factors and the residual factor returns.

6. The method of claim 1, wherein the idiosyncratic effect return attribution is based on an idiosyncratic return and a portfolio weight.

7. The method of claim 1, wherein the custom factor risk attribution is based on a volatility of the custom factor return attribution and a correlation between the custom factor return attribution and the return of the portfolio.

8. The method of claim 1, wherein the residual factor risk attribution is based on a volatility of the residual factor return attribution and a correlation between the residual factor return attribution and the return of the portfolio.

9. The method of claim 1, wherein the idiosyncratic effect risk attribution is based on a volatility of the idiosyncratic effect return attribution and a correlation between the idiosyncratic effect return attribution and the return of the portfolio.

10. The method of claim 2, wherein, the risk-adjusted performance custom factor attribution is based on a risk weight for the custom factors, the custom factor return attribution and the volatility of the custom factor return attribution.

11. The method of claim 2, wherein the risk-adjusted performance residual factor attribution is based on a risk weight for the residual factors, the residual factor return attribution and the volatility of the residual factor return attribution.

12. The method of claim 2, wherein the risk-adjusted performance idiosyncratic effect attribution is based on a risk weight for the idiosyncratic effects, the idiosyncratic effect return attribution and the volatility of the idiosyncratic effect return attribution.

13. A computer readable medium having instruction stored thereon which, when executed by a processor, cause the processor to:
   determine residual factors for an investment portfolio based on a matrix of custom factors, wherein the custom factors reflect an investment process for the investment portfolio, wherein the residual factors correspond to a matrix of factor exposures for the investment portfolio obtained by orthogonalizing risk factors for the investment portfolio to the matrix of custom factors, wherein the risk factors account for risk in the investment portfolio and are different from the custom factors;
   determine an attribution of the return of the investment portfolio to the custom factors, an attribution of the return of the investment portfolio to the residual factors, and an attribution of the return of the investment portfolio to idiosyncratic effects; and
   determine an attribution of the risk of the investment portfolio to the custom factors, an attribution of the risk of the investment portfolio to the residual factors, and an attribution of the risk of the investment portfolio to the idiosyncratic effects.

14. The computer readable medium of claim 13, having further stored thereon instructions which when executed by the processor cause the processor to determine an attribution of risk-adjusted performance for the investment portfolio to the custom factors, an attribution of the risk-adjusted performance of the investment portfolio to the residual factors, and an attribution of the risk-adjusted performance of the investment portfolio to idiosyncratic effects based on the return attributions and the risk attributions.

15. The computer readable medium of claim 13, wherein the custom factors comprise at least one of a market factor, a beta factor, a value factor, or a size factor.

16. The computer readable medium of claim 13, wherein the custom factor return attribution is based on the custom factors and custom factor returns.

17. The computer readable medium of claim 13, wherein the residual factor return attribution is based on the residual factors and the residual factor returns.

18. The computer readable medium of claim 13, wherein the idiosyncratic effect return attribution is based on an idiosyncratic return and a portfolio weight.

19. The computer readable medium of claim 13, wherein the custom factor risk attribution is based on a volatility of the custom factor return attribution and a correlation between the custom factor return attribution and the return of the portfolio.

20. The computer readable medium of claim 13, wherein the residual factor risk attribution is based on a volatility of the residual factor return attribution and a correlation between the residual factor return attribution and the return of the portfolio.

21. The computer readable medium of claim 13, wherein the idiosyncratic effect risk attribution is based on a volatility of the idiosyncratic effect return attribution and a correlation between the idiosyncratic effect return attribution and the return of the portfolio.

22. The computer readable medium of claim 14, wherein the risk-adjusted performance custom factor attribution is based on a risk weight for the custom factors, the custom factor return attribution and the volatility of the custom factor return attribution.

23. The computer readable medium of claim 14, wherein the risk-adjusted performance residual factor attribution is based on a risk weight for the residual factors, the residual factor return attribution and the volatility of the residual factor return attribution.

24. The computer readable medium of claim 14, wherein the risk-adjusted performance idiosyncratic effect attribution is based on a risk weight for the idiosyncratic effects, the idiosyncratic effect return attribution and the volatility of the idiosyncratic effect return attribution.

25. A system comprising:
   a processor; and
   a memory in communication with the processor, wherein the memory stores instructions which when executed by the processor causes the processor to:
   determine residual factors for an investment portfolio based on a matrix of custom factors, wherein the custom factors reflect an investment process for the investment portfolio, wherein the residual factors correspond to a matrix of factor exposures for the portfolio obtained by orthogonalizing risk factors for the investment portfolio to the matrix of custom factors, wherein the risk factors account for risk in the investment portfolio and are different from the custom factors;

determine an attribution of the return of the investment portfolio to the custom factors, an attribution of the return of the investment portfolio to the residual factors, and an attribution of the return of the investment portfolio to idiosyncratic effects; and determine an attribution of the risk of the investment portfolio to the custom factors, an attribution of the risk of the investment portfolio to the residual factors, and an attribution of the risk of the investment portfolio to the idiosyncratic effects.

26. The system of claim 25, wherein the memory further stores instructions which when executed by the processor cause the processor to determine an attribution of risk-adjusted performance for the investment portfolio to the custom factors, an attribution of the risk-adjusted performance of the investment portfolio to the residual factors, and an attribution of the risk-adjusted performance of the investment portfolio to idiosyncratic effects based on the return attributions and the risk attributions.

27. The system of claim 25, wherein the custom factor is at least one of a market factor, a beta factor, a value factor, and a size factor.

28. The system of claim 25, wherein the custom factor return attribution is based on the custom factors and custom factor returns.

29. The system of claim 25, wherein the residual factor return attribution is based on the residual factors and the residual factor returns.

30. The system of claim 25, wherein the idiosyncratic effect return attribution is based on an idiosyncratic return and a portfolio weight.

31. The system of claim 25, wherein the custom factor risk attribution is based on a volatility of the custom factor return attribution and a correlation between the custom factor return attribution and the return of the portfolio.

32. The system of claim 25, wherein the residual factor risk attribution is based on a volatility of the residual factor return attribution and a correlation between the residual factor return attribution and the return of the portfolio.

33. The system of claim 25, wherein the idiosyncratic effect risk attribution is based on a volatility of the idiosyncratic effect return attribution and a correlation between the idiosyncratic effect return attribution and the return of the portfolio.

34. The system of claim 26, wherein the risk-adjusted performance custom factor attribution is based on a risk weight for the custom factors, the custom factor return attribution and the volatility of the custom factor return attribution.

35. The system of claim 26, wherein the risk-adjusted performance residual factor attribution is based on a risk weight for the residual factors, the residual factor return attribution and the volatility of the residual factor return attribution.

36. The system of claim 26, wherein the risk-adjusted performance idiosyncratic effect attribution is based on a risk weight for the idiosyncratic effects, the idiosyncratic effect return attribution and the volatility of the idiosyncratic effect return attribution.

37. A system comprising:
a processor; and
a database in communication with the processor, wherein the database stores a matrix of custom factors for an investment portfolio, wherein the custom factors reflect an investment process for the investment portfolio, and wherein the processor is programmed to:

determine residual factors for the investment portfolio based on the matrix of custom factors, wherein the residual factors correspond to a matrix of factor exposures for the investment portfolio obtained by orthogonalizing risk factors for the portfolio to the matrix of custom factors, wherein the risk factors account for risk in the investment portfolio and are different from the custom factors;

determine an attribution of the return of the investment portfolio to the custom factors, an attribution of the return of the investment portfolio to the residual factors, and an attribution of the return of the investment portfolio to idiosyncratic effects; and determine an attribution of the risk of the investment portfolio to the custom factors, an attribution of the risk of the investment portfolio to the residual factors, and an attribution of the risk of the investment portfolio to the idiosyncratic effects.

38. The system of claim 37, wherein the processor is further programmed to determine an attribution of risk-adjusted performance for the investment portfolio to the custom factors, an attribution of the risk-adjusted performance of the investment portfolio to the residual factors, and an attribution of the risk-adjusted performance of the investment portfolio to idiosyncratic effects based on the return attributions and the risk attributions.

39. The system of claim 37, wherein the custom factor is at least one of a market factor, a beta factor, a value factor, and a size factor.

40. The system of claim 37, wherein the custom factor return attribution is based on the custom factors and custom factor returns.

41. The system of claim 37, wherein the residual factor return attribution is based on the residual factors and the residual factor returns.

42. The system of claim 37, wherein the idiosyncratic effect return attribution is based on an idiosyncratic return and a portfolio weight.

43. The system of claim 37, wherein the custom factor risk attribution is based on a volatility of the custom factor return attribution and a correlation between the custom factor return attribution and the return of the portfolio.

44. The system of claim 37, wherein the residual factor risk attribution is based on a volatility of the residual factor return attribution and a correlation between the residual factor return attribution and the return of the portfolio.

45. The system of claim 37, wherein the idiosyncratic effect risk attribution is based on a volatility of the idiosyncratic effect return attribution and a correlation between the idiosyncratic effect return attribution and the return of the portfolio.

46. The system of claim 38, wherein the risk-adjusted performance custom factor attribution is based on a risk weight for the custom factors, the custom factor return attribution and the volatility of the custom factor return attribution.

47. The system of claim 38, wherein the risk-adjusted performance residual factor attribution is based on a risk weight for the residual factors, the residual factor return attribution and the volatility of the residual factor return attribution.

48. The system of claim 38, wherein the risk-adjusted performance idiosyncratic effect attribution is based on a risk weight for the idiosyncratic effects, the idiosyncratic effect return attribution and the volatility of the idiosyncratic effect return attribution.

49. A computer-implemented method of attributing return, risk, and risk-adjusted performance for an investment portfolio, the method comprising:

determining, by a computer system, residual factors for the investment portfolio based on a matrix of custom factors, wherein the custom factors reflect an investment process for the investment portfolio, wherein the residual factors correspond to a matrix of factor exposures for the portfolio obtained by orthogonalizing risk factors for the portfolio to the matrix of custom factors, wherein the risk factors account for risk in the investment portfolio and are different from the custom factors, and wherein the computer system comprises at least one processor;

determining, by the computer system, an attribution of the return of the investment portfolio to the custom factors, an attribution of the return of the investment portfolio to the residual factors, and an attribution of the return of the investment portfolio to idiosyncratic effects;

determining, by the computer system, an attribution of the risk of the investment portfolio to the custom factors, an attribution of the risk of the investment portfolio to the residual factors, and an attribution of the risk of the investment portfolio to the idiosyncratic effects; and determining, by the computer system, an attribution of risk-adjusted performance for the investment portfolio to the custom factors, an attribution of the risk-adjusted performance of the investment portfolio to the residual factors, and an attribution of the risk-adjusted performance of the investment portfolio to idiosyncratic effects based on the return attributions and the risk attributions.

50. A computer-implemented method comprising:

receiving, by a computer system that comprises at least one processor, via a computer data network, data indicating a set of user-selected custom factors for an investment portfolio, wherein the custom factors reflect an investment process for the investment portfolio, and wherein the set of custom factors is not identical to a set of risk factors for the investment process that account for risk to the investment portfolio;

determining, by the computer system, an attribution of the return of the investment portfolio to the set of user-selected custom factors; and determining, by the computer system, an attribution of the risk of the investment portfolio to the set of user-selected custom factors.

51. A system comprising:

a processor; and a memory in communication with the processor, wherein the memory stores instructions which when executed by the processor causes the processor to:

receive, via a computer data network, data indicating a set of user-selected custom factors for an investment portfolio, wherein the custom factors reflect an investment process for the investment portfolio, and wherein the set of custom factors is not identical to a set of risk factors for the investment process that account for risk to the investment portfolio;

determine an attribution of the return of the investment portfolio to the set of user-selected custom factors; and determine an attribution of the risk of the investment portfolio to the set of user-selected custom factors.

52. A computer readable medium having instruction stored thereon which, when executed by a processor, cause the processor to:

receive data indicating a set of user-selected custom factors for an investment portfolio, wherein the custom factors reflect an investment process for the investment portfolio, and wherein the set of custom factors is not identical to a set of risk factors for the investment process that account for risk to the investment portfolio;

determine an attribution of the return of the investment portfolio to the set of user-selected custom factors; and determine an attribution of the risk of the investment portfolio to the set of user-selected custom factors.

\* \* \* \* \*